United States Patent [19]

Stricker

[11] Patent Number: 5,507,114
[45] Date of Patent: Apr. 16, 1996

[54] NIGHT CRAWLER CONTAINER

[76] Inventor: Nicholas J. Stricker, Rt. 1, Box 1177, Bridger, Mont. 59014

[21] Appl. No.: 238,516

[22] Filed: May 5, 1994

[51] Int. Cl.$^6$ ................................................. A01K 97/00
[52] U.S. Cl. ................................ 43/55; 43/54.1; 62/457.2
[58] Field of Search ........................ 43/54.1, 57.1, 43/55, 56; 206/315.1, 315.11, 579; 62/457.4, 457.5, 457.2, 372

[56] References Cited

U.S. PATENT DOCUMENTS

| 2,850,885 | 9/1958 | Mohr | 62/372 |
|---|---|---|---|
| 2,935,858 | 5/1960 | Kingery | 43/55 |
| 3,339,305 | 9/1967 | Smith | 43/56 |
| 3,344,552 | 10/1967 | Glasco | 43/56 |
| 3,406,532 | 10/1968 | Rownd et al. | 62/457.5 |
| 3,452,469 | 7/1969 | White | 62/372 |
| 3,566,836 | 3/1971 | Elfert | 43/55 |
| 3,882,628 | 5/1975 | Stouder | 43/55 |
| 4,646,682 | 3/1987 | Wilson . | |
| 4,697,386 | 10/1987 | Fenske | 43/55 |
| 4,759,148 | 7/1988 | Love | 43/56 |
| 4,763,438 | 8/1988 | Saliaris . | |
| 4,815,416 | 3/1989 | Wolff . | |
| 4,862,634 | 9/1989 | Surface . | |
| 5,035,122 | 7/1991 | Oogjen . | |
| 5,042,260 | 8/1991 | George, Sr. | 62/457.2 |

Primary Examiner—Maurina T. Rachuba
Assistant Examiner—Chuck Y. Mah

[57] ABSTRACT

A container is arranged to maintain worms, such as night crawlers and the like, within an enclosure, the enclosure having a insulated cooling medium to maintain the bait at a desired temperature, thereby preserving the bait prior to use.

1 Claim, 2 Drawing Sheets

NIGHT CRAWLER CONTAINER

BACKGROUND OF THE INVENTION

1. Field of the Invention

The field of invention relates to container structure, and more particularly pertains to a new night crawler container wherein the same is arranged to maintain a cooled condition within the conveniently transported container structure.

2. Description of the Prior Art

Bait containers of various types have been utilized throughout the prior art and exemplified by U.S. Pat. Nos. 4,862,634; 4,646,682; 4,763,438; 4,815,416; and 5,035,122.

The instant invention attempts to overcome deficiencies of the prior art by providing for a compact and convenient organization arranged for ease of transport and use and in this respect, the present invention substantially fulfills this need.

SUMMARY OF THE INVENTION

In view of the disadvantages inherent in the known types of container apparatus now present in the prior art, the present invention provides a night crawler container wherein the same is arranged for maintaining of night crawlers in a preserved condition relative to a fishing event.

To attain this, the present invention provides a container arranged to maintain worms, such as night crawlers and the like, within an enclosure, the enclosure having a insulated cooling medium to maintain the bait at a desired temperature, thereby preserving the bait prior to use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new night crawler container which may be easily and efficiently manufactured and marketed.

It is a further object of the present invention to provide a new night crawler container which is of a durable and reliable construction.

An even further object of the present invention is to provide a new night crawler container which is susceptible of a low cost of manufacture with regard to both materials and labor, and which accordingly is then susceptible of low prices of sale to the consuming public, thereby making such night crawler containers economically available to the buying public.

Still yet another object of the present invention is to provide a new night crawler container which provides in the apparatuses and methods of the prior art some of the advantages thereof, while simultaneously overcoming some of the disadvantages normally associated therewith.

Even still yet another object of the present invention is to provide a new night crawler container arranged to maintain worms, such as night crawlers and the like, within an enclosure, the enclosure having a insulated cooling medium to maintain the bait at a desired temperature, thereby preserving the bait prior to use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
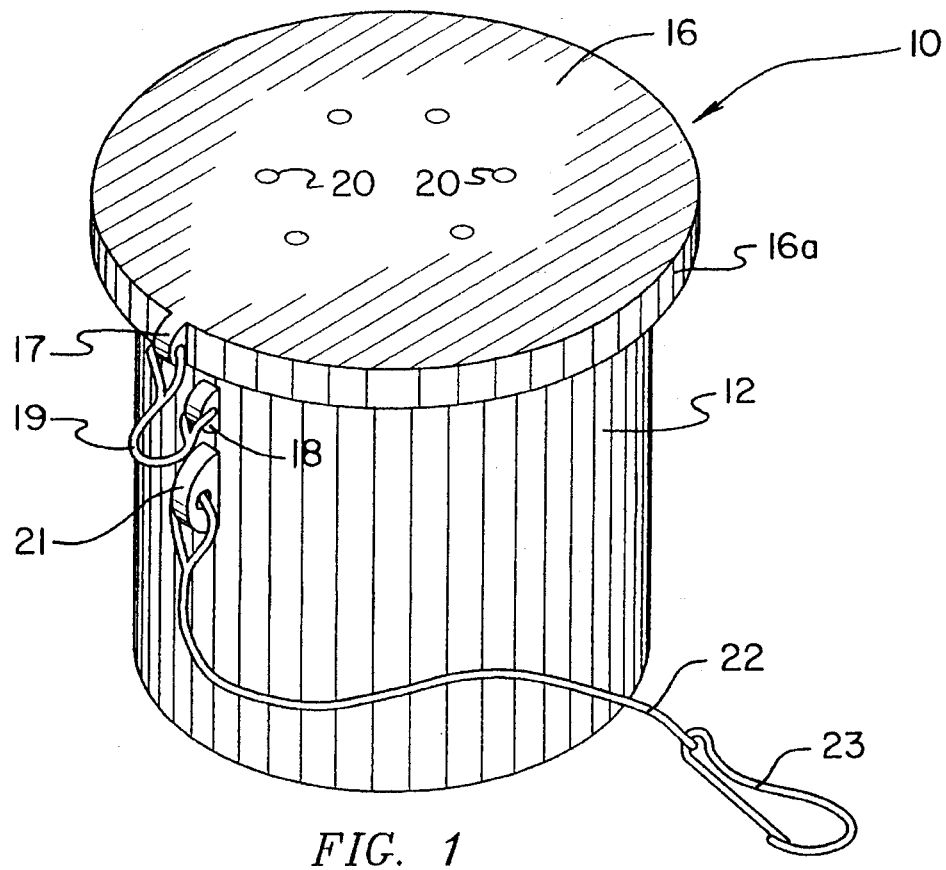
FIG. 1 is an isometric illustration of the invention.
Figure 2:
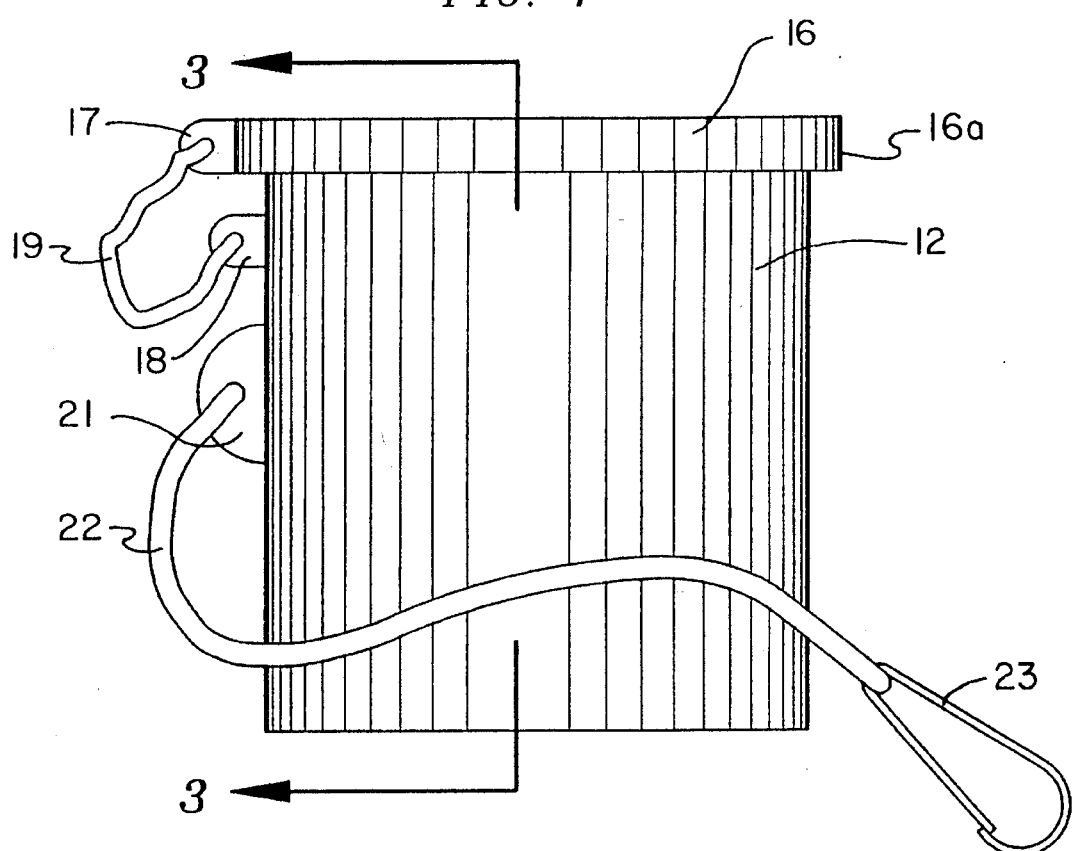
FIG. 2 is an orthographic side view of the invention.

With reference now to the drawings, and in particular to FIGS. 1–4 thereof, a new night crawler container embodying the principles and concepts of the present invention and generally designated by the reference numeral 10 will be described.

Figure 3:
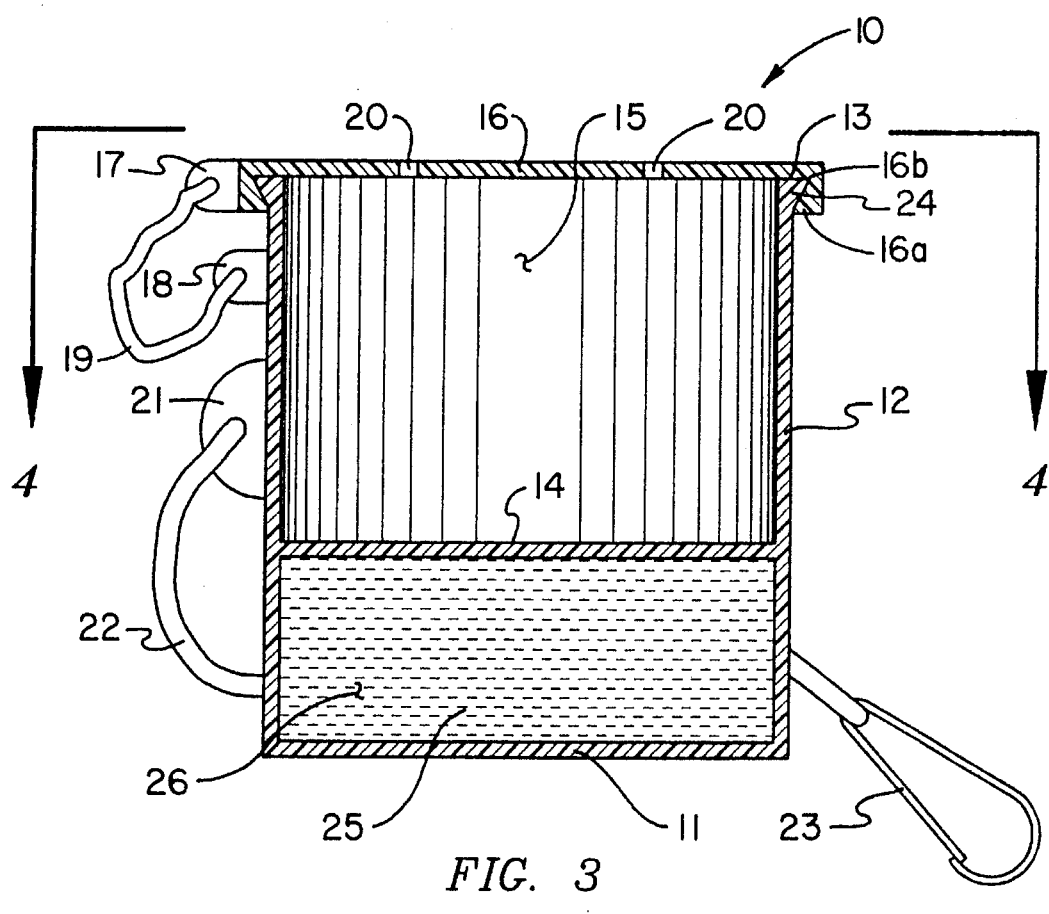
FIG. 3 is an orthographic view, taken along the lines 3—3 of FIG. 2 in the direction indicated by the arrows.
Figure 4:
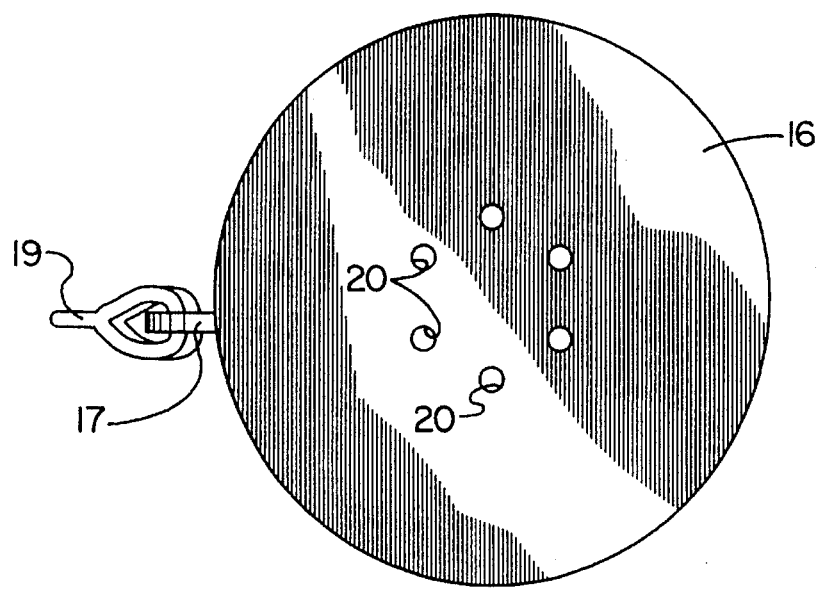
FIG. 4 is an orthographic view, taken along the lines 4—4 of FIG. 3 in the direction indicated by the arrows.

More specifically, the night crawler container 10 includes a container floor 11 integrally formed with a container side wall 12, with the side wall 12 having a wall entrance periphery 13 at an uppermost distal end of the side wall 12. An intermediate floor 14 is mounted within the container spaced from the floor 11 and allows a freezable gel 25 to be positioned within a freezer cavity 26 between the intermediate floor 14 and the container floor 11. In this manner, the gel 25 may be frozen prior to night crawlers being positioned within a container cavity 15 between the intermediate floor 14 and the entrance periphery 13, such that the night crawlers are maintained in a condition of freshness prior to use. A lid 16 is arranged for securement onto the entrance periphery 13, with the entrance periphery being formed with an annular flange 24 projecting laterally of the entrance periphery and exteriorly of the container side wall 12 to provide for snap-fit connection of the lid, as the lid includes an annular skirt 16a having a skirt cavity 16b of an annular configuration to receive the annular flange 24, such as illustrated in FIG. 3.

In addition, a first side wall lug 18 is mounted to the sidewall 12 and arranged to include a tether line 19, with the first side wall lug 18 cooperative with a lid lug 17 mounted to the tether line 19 and to the lid 16 to prevent loss of the lid when removed from the container side wall 12. Further, a second side wall lug 21 is secured to the side wall 12 and provided with a second lug tether line 22 terminating in a connector 23 permitting securement of the connector 23 to an individual's belt and the like permitting ease of transport of the structure 10. Further, a plurality of lid apertures 20 may be employed directed through the lid to permit ventilation into the container cavity 15 sized to prevent night crawlers from being accessed through the apertures 20 but permitting air circulation within the cavity 15 to assist in preserving night crawlers positioned within the cavity 15.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A worm container comprising:

a substantially circular floor;

a side wall circumscribing and extending upwardly from the floor, the side wall having an entrance periphery, the entrance periphery including an annular flange projecting laterally and exteriorly of the side wall;

a lid having a lid skirt, the lid skirt including a lid skirt annular cavity arranged for reception of the annular flange;

an intermediate floor mounted within the container spaced from the floor to define a freezer cavity between the intermediate floor and the floor, and a container cavity between the intermediate floor and the entrance periphery; and, a freezable gel positioned within the freezer cavity;

a lid lug mounted to the lid, a side wall lug mounted to the side wall, and a tether line coupled to both the lid lug and the side wall lug for tethering the lid relative to the side wall;

wherein said lid includes a plurality of lid apertures directed through the lid to permit ventilation into the container cavity, the apertures being sized to prevent worms from being accessed through the apertures but permitting air circulation within the container cavity to assist in preserving worms positioned within the container cavity;

a second side wall lug secured to the side wall, and a second lug tether line coupled to said second side wall lug and terminating in a connector permitting securement of the connector to an object, thereby anchoring said container to said object.

* * * * *